US012626858B2

(12) United States Patent
Asai et al.

(10) Patent No.: US 12,626,858 B2
(45) Date of Patent: May 12, 2026

(54) MAGNETICALLY COUPLED REACTOR AND BOOSTING CIRCUIT

(71) Applicant: Komatsu Ltd., Tokyo (JP)

(72) Inventors: Inami Asai, Tokyo (JP); Makoto Chiba, Tokyo (JP); Yohei Inoue, Tokyo (JP); Takeshi Yoshida, Tokyo (JP)

(73) Assignee: KOMATSU LTD., Tokyo (JP)

( * ) Notice: Subject to any disclaimer, the term of this patent is extended or adjusted under 35 U.S.C. 154(b) by 184 days.

(21) Appl. No.: 18/574,097

(22) PCT Filed: Jul. 7, 2022

(86) PCT No.: PCT/JP2022/026961
§ 371 (c)(1),
(2) Date: Dec. 26, 2023

(87) PCT Pub. No.: WO2023/282323
PCT Pub. Date: Jan. 12, 2023

(65) Prior Publication Data
US 2024/0321512 A1 Sep. 26, 2024

(30) Foreign Application Priority Data

Jul. 9, 2021 (JP) ................................. 2021-114397

(51) Int. Cl.
*H01F 27/30* (2006.01)
*H01F 27/24* (2006.01)
(Continued)

(52) U.S. Cl.
CPC ........... *H01F 27/346* (2013.01); *H01F 27/24* (2013.01); *H01F 27/306* (2013.01); *H02M 3/158* (2013.01)

(58) Field of Classification Search
CPC ........ H01F 37/00; H01F 27/306; H01F 27/24; H01F 27/324; H01F 27/26;
(Continued)

(56) References Cited

U.S. PATENT DOCUMENTS

| | | | | |
|---|---|---|---|---|
| 2011/0234359 A1* | 9/2011 | Ono | H01F 27/327 |
| | | | 336/216 |
| 2019/0237237 A1* | 8/2019 | Inaba | H01F 27/2823 |
| 2020/0389049 A1* | 12/2020 | Kunii | H01F 27/16 |

FOREIGN PATENT DOCUMENTS

| | | | |
|---|---|---|---|
| JP | 2003-033013 A | 1/2003 |
| JP | 2006-294829 A | 10/2006 |

(Continued)

*Primary Examiner* — Bryan R Perez
(74) *Attorney, Agent, or Firm* — Troutman Pepper Locke LLP

(57) ABSTRACT

A reactor core of the magnetically coupled reactor includes a first outer core portion including two first leg portions extending in a first direction and a first base portion linking the two first leg portions, a second outer core portion including two second leg portions extending in the first direction and a second base portion linking the two second leg portions, and an intermediate core portion integrally extending continuously in the first direction and connecting the first leg portions and the second leg portions, in which a first connection portion, to which the first leg portions and the intermediate core portion are connected, is positioned in which a first coil portion is wound in the first direction, and a second connection portion, to which the second leg portions and the intermediate core portion are connected, is positioned in which the second coil portion is wound in the first direction.

7 Claims, 5 Drawing Sheets

(51) Int. Cl.
    *H01F 27/34*      (2006.01)
    *H02M 3/158*    (2006.01)

(58) Field of Classification Search
    CPC .. H01F 27/2823; H01F 27/346; H01F 27/263;
                H01F 27/2847; H01F 27/325; H01F
             27/245; H01F 27/022; H01F 27/255;
                    H01F 27/2895; H01F 27/40
    See application file for complete search history.

(56)              References Cited

FOREIGN PATENT DOCUMENTS

| | | | |
|----|------------|----|---------|
| JP | 2007-043852 | A | 2/2007 |
| JP | 2007-116066 | A | 5/2007 |
| JP | 2010-080907 | A | 4/2010 |
| JP | 2016-066744 | A | 4/2016 |
| JP | 6106646 | B2 | 4/2017 |
| JP | 6301596 | B2 | 3/2018 |
| JP | 2020-202633 | A | 12/2020 |

* cited by examiner

FIG. 2

MAGNETICALLY COUPLED REACTOR AND BOOSTING CIRCUIT

TECHNICAL FIELD

The present disclosure relates to a magnetically coupled reactor and a boosting circuit.

Priority is claimed on Japanese Patent Application No. 2021-114397, filed on Jul. 9, 2021, the content of which is incorporated herein by reference.

BACKGROUND ART

Patent Document 1 describes a magnetically coupled reactor that is mounted on vehicles such as a hybrid vehicle, an electric vehicle, and the like. A reactor core of this reactor has two U-shaped split cores, and end surfaces of these split cores are butted together to form a closed magnetic circuit. Further, in Patent Document 1, multi-phase coils are wound around one reactor core to cancel out the DC magnetic flux by reversing the directions of the magnetic flux from each other.

CITATION LIST

Patent Document

[Patent Document 1]
Japanese Unexamined Patent Application, First Publication No. 2020-202633

SUMMARY OF INVENTION

Technical Problem

In the magnetically coupled reactor described in Patent Document 1, magnetic flux leaks from a portion where end surfaces of the reactor core are butted together. There is a possibility that, when this leakage magnetic flux interlinks with winding wires of the coil, eddy currents may be generated in the winding wires. The generation of such eddy currents causes a deviation in current density of the winding wires, which may cause a temperature rise. Therefore, there is a problem that requires measures such as increasing the size of the magnetically coupled reactor.

The present disclosure has been made in view of such problems, and an object of the present disclosure is to provide a magnetically coupled reactor and a boosting circuit capable of reducing the interlinking of leakage magnetic flux with winding wires while suppressing an increase in size.

Solution to Problem

A magnetically coupled reactor according to an aspect of the present disclosure includes a reactor core forming a closed magnetic circuit, a first coil portion wound around the reactor core in a split manner, and a second coil portion wound in a split manner at a position apart from the first coil portion in a first direction in the reactor core. The reactor core includes a first outer core portion including two first leg portions extending in the first direction and a first base portion linking the two first leg portions on a first side in the first direction, a second outer core portion including two second leg portions extending in the first direction and a second base portion linking the two second leg portions on a second side in the first direction, and two intermediate core portions arranged side by side in a second direction intersecting the first direction and extending continuously and integrally in the first direction to connect the first leg portions and the second leg portions. The first coil portion and the second coil portion are wound in a split manner to span at least across the two intermediate core portions arranged side by side in the second direction, a first connection portion, to which the first leg portions and the intermediate core portion are connected, is positioned in an area in which the first coil portion is wound in the first direction, and a second connection portion, to which the second leg portions and the intermediate core portion are connected, is positioned in an area in which the second coil portion is wound in the first direction.

Advantageous Effects of Invention

According to the above aspect, it is possible to reduce the interlinking of leakage magnetic flux with winding wires while suppressing an increase in size.

BRIEF DESCRIPTION OF DRAWINGS

FIG. 2 is a perspective view of a reactor according to an embodiment of the present disclosure.

DESCRIPTION OF EMBODIMENTS

Figure 1:
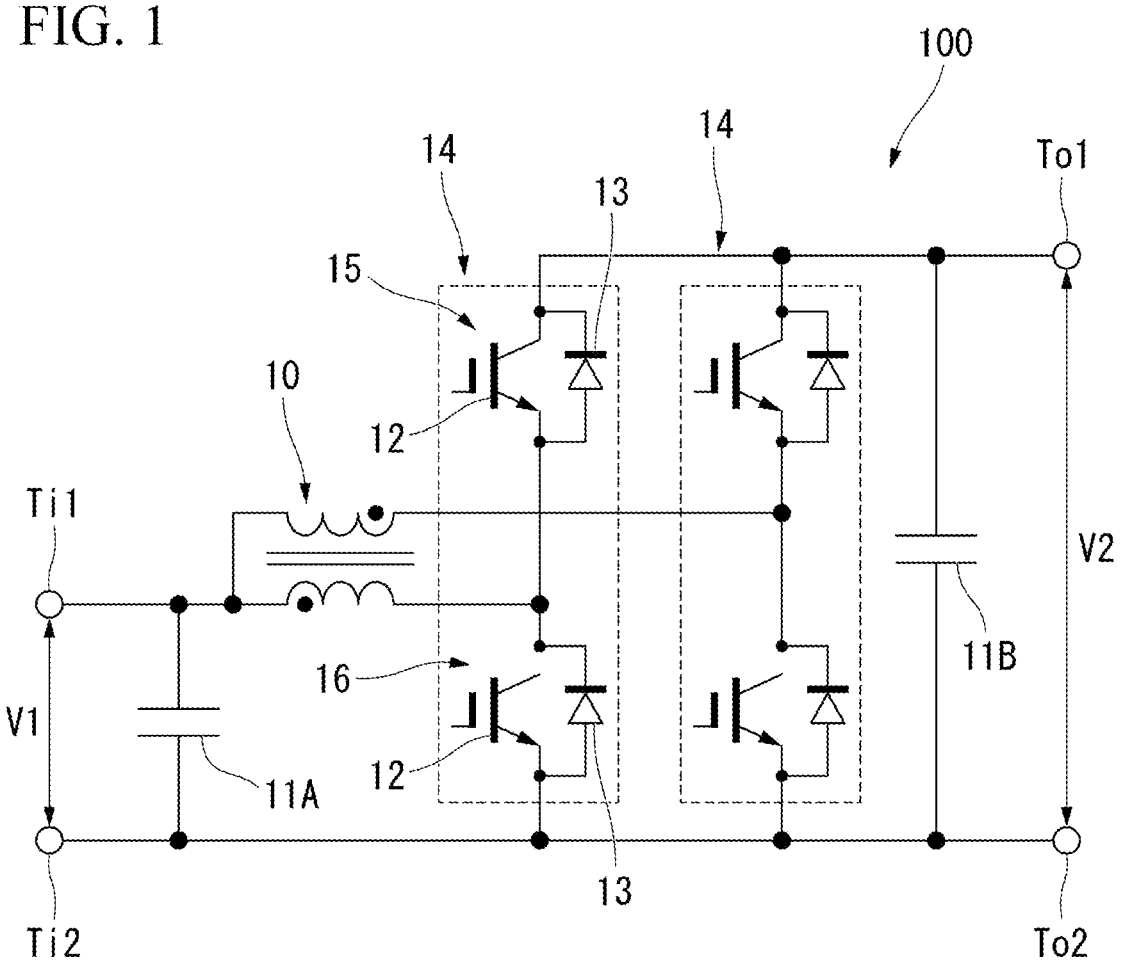
FIG. 1 is a circuit diagram of a boosting circuit according to an embodiment of the present disclosure.

Hereinafter, an embodiment of the present disclosure will be described in detail with reference to FIGS. 1 to 4.
<Boosting Circuit>
As shown in FIG. 1, a magnetically coupled reactor 10 of the present embodiment is a magnetically coupled reactor used in an interleaved boosting circuit 100. The boosting circuit 100 of the present embodiment is built in, for example, an inverter that drives an electric motor mounted on a hybrid hydraulic excavator or the like and boosts a terminal voltage V1 of a capacitor or the like to a voltage V2 required by the inverter.

Figure 2:
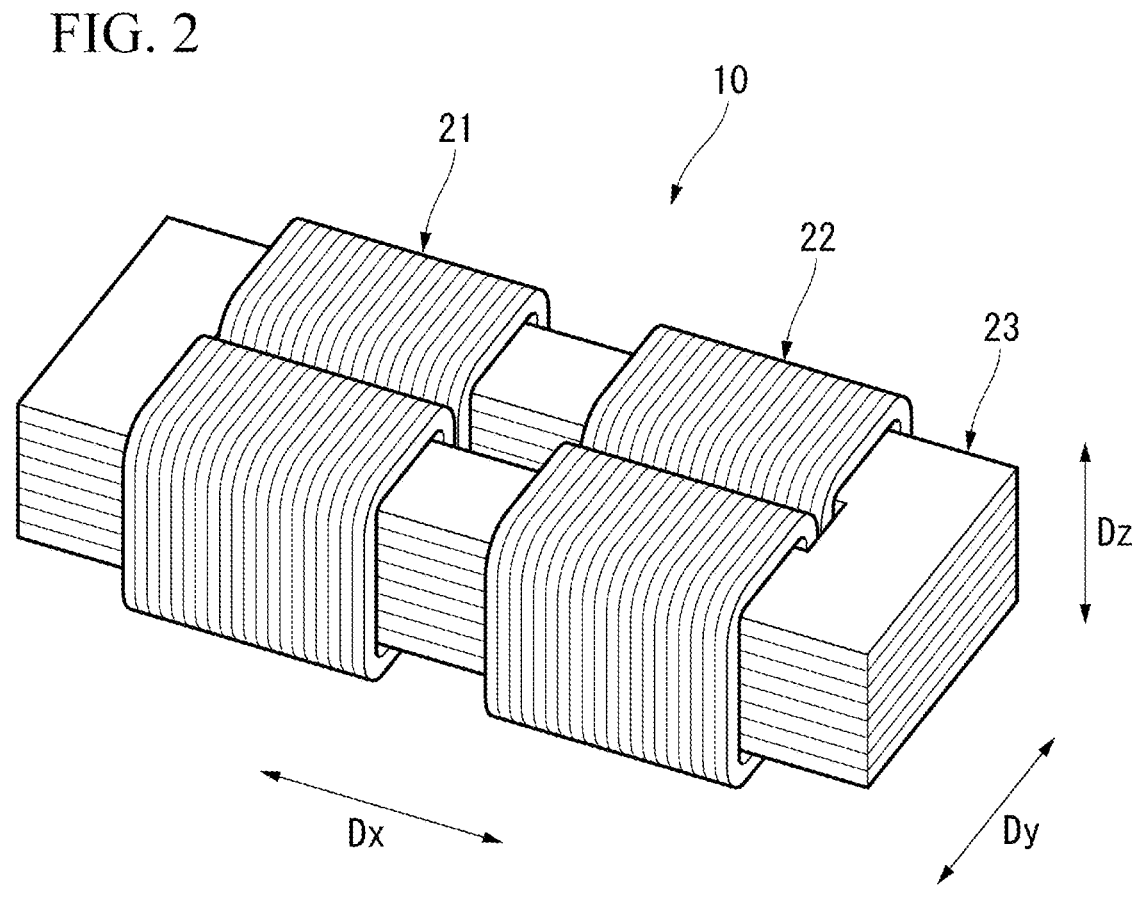

The boosting circuit 100 includes a smoothing capacitor 11A provided between input terminals Ti1 and Ti2, a smoothing capacitor 11B provided between output terminals To1 and To2, and a multi-phase (two-phase in the present embodiment) boosting chopper circuit 14. Each of these two-phase boosting chopper circuits 14 is constituted by switching elements 12 and freewheeling diodes 13, each of which constitutes a high-side arm 15 and a low-side arm 16, and a magnetically coupled reactor 10 connected between the switching elements 12 of the high-side arms 15 and the switching elements 12 of the low-side arms 16. These two-phase boosting chopper circuits 14 are driven out of phase with each other.
<Magnetically Coupled Reactor>
As shown in FIG. 2, the magnetically coupled reactor 10 includes a first coil portion 21 and a second coil portion 22 which are used in the two-phase boosting chopper circuit 14, and one reactor core 23 which forms a closed magnetic circuit. The reactor core 23 magnetically couples the first coil portion 21 and the second coil portion 22. The first coil portion 21 and the second coil portion 22 are wound around the reactor core 23 (examples of the directions of the magnetic fluxes are indicated by arrows in FIG. 3) so that the magnetic fluxes of the first coil portion 21 and the second coil portion 22 are canceled out by each other. The magnetically coupled reactor 10 of the present embodiment is a reactor used for a hybrid hydraulic excavator or the like, in which a larger current flows as compared with the magnetically coupled reactor used for vehicles such as automobiles and the like. Therefore, the magnetically coupled reactor 10 of the present embodiment is larger compared with reactors used in vehicles such as automobiles and the like.

<Reactor Core>

Figure 3:
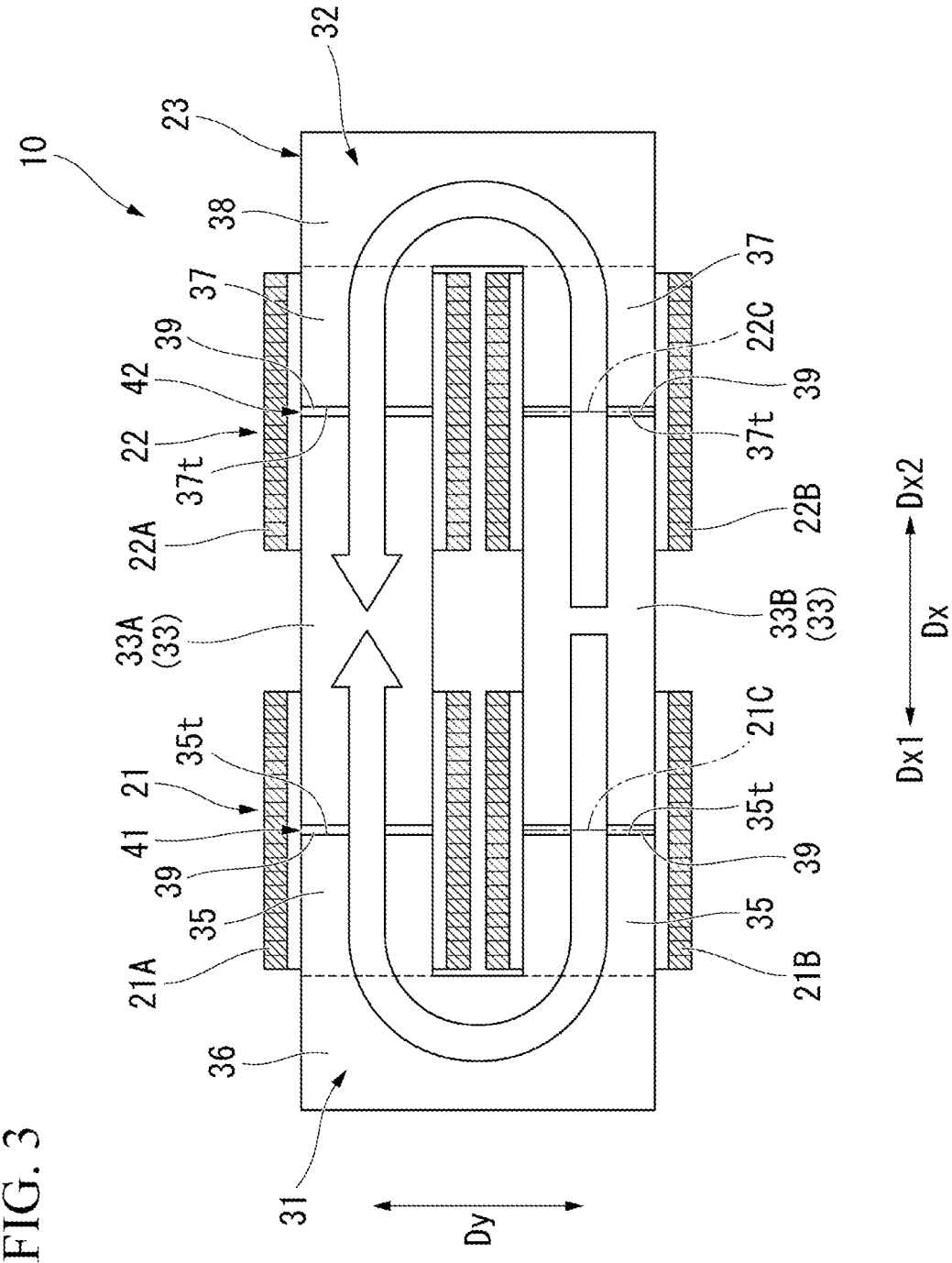
FIG. 3 is a plan view of a reactor core according to an embodiment of the present disclosure.
Figure 4:
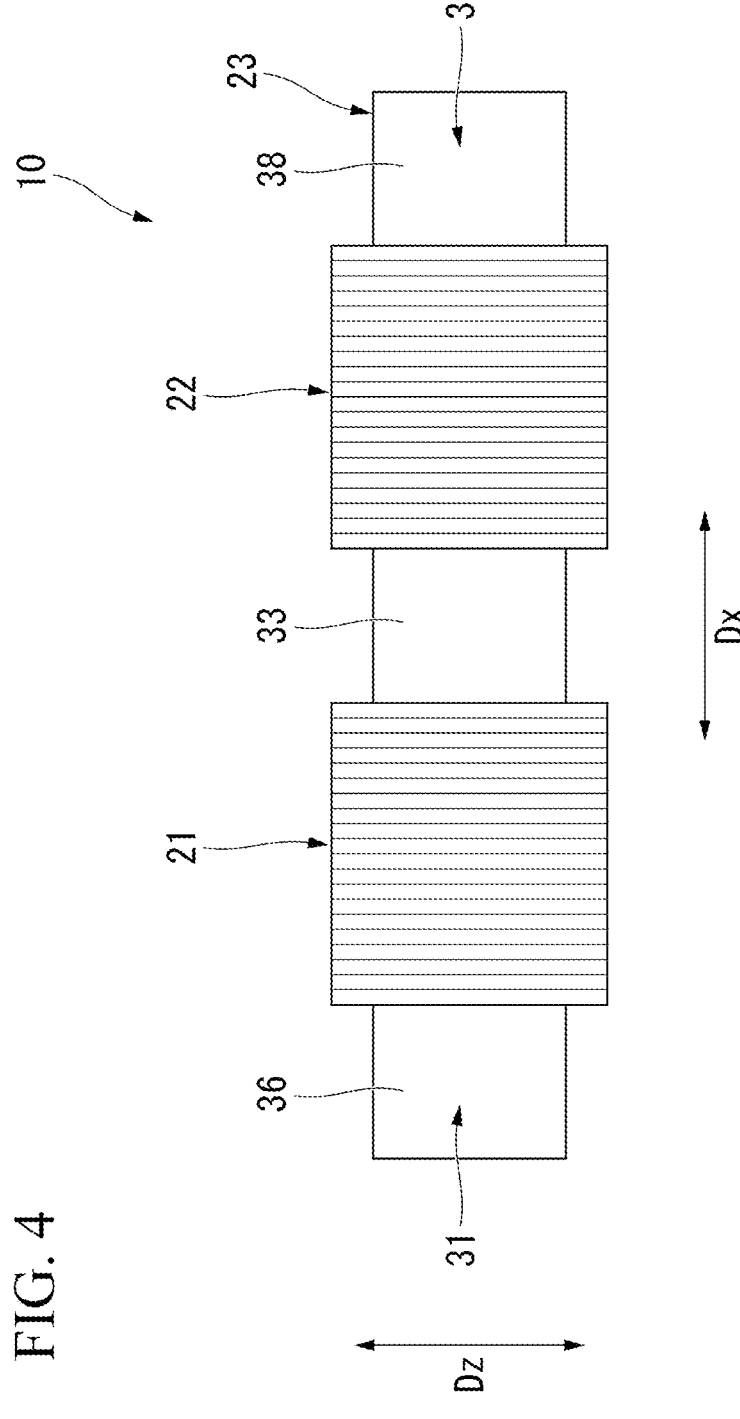
FIG. 4 is a side view of the reactor as viewed from a second direction.

As shown in FIGS. 3 and 4, the reactor core 23 includes a first outer core portion 31, a second outer core portion 32, and two intermediate core portions 33. In the following description, a first direction is referred to as "Dx", and a second direction intersecting the first direction is referred to as "Dy". Further, a third direction intersecting the first direction Dx and the second direction Dy is referred to as "Dz". The reactor core 23 in the present embodiment is formed, for example, by stacking multiple electromagnetic steel sheets such as silicon steel sheets and the like in the third direction Dz.

The first outer core portion 31 includes two first leg portions 35 and one first base portion 36. Both of the two first leg portions 35 extend in the first direction Dx. The two first leg portions 35 of the present embodiment have the same quadrangular prism shape and have the same length in the first direction Dx. These two first leg portions 35 are disposed apart from each other in the second direction Dy. A spacing between the two first leg portions 35 in the second direction Dy is set according to a wire diameter or the like of the first coil portion 21.

The first base portion 36 is disposed on the first side Dx1 of the two first leg portions 35 in the first direction Dx and is formed to span across the two first leg portions 35 in the second direction Dy. That is, the first base portion 36 links the two first leg portions 35 on the first side Dx1 in the first direction Dx. The first base portion 36 in the present embodiment has a quadrangular prism shape extending in the second direction Dy. In addition, the first base portion 36 is formed integrally with the first leg portions 35. In other words, the first leg portions 35 and the first base portion 36 are continuous without forming a gap or the like therebetween. Accordingly, the first outer core portion 31 has a U-shape when viewed from the third direction Dz. In the present embodiment, an example is shown where the cross-sectional area of the first base portion 36 in the cross section perpendicular to the second direction Dy and the cross-sectional area of the first leg portions 35 in the cross section perpendicular to the first direction Dx are the same. In addition, end surfaces 35t of the two first leg portions 35 are planes perpendicular to the first direction Dx and face the second side Dx2 in the first direction Dx.

The second outer core portion 32 is formed symmetrically with the first outer core portion 31 in the first direction Dx. The second outer core portion 32 includes two second leg portions 37 and one second base portion 38. Both of the two second leg portions 37 extend in the first direction Dx. The two second leg portions 37 of the present embodiment have the same quadrangular prism shape as the first leg portions 35. The lengths of the two second leg portions 37 in the first direction Dx are the same. Then, these two second leg portions 37 are disposed apart from each other in the second direction Dy. The spacing between the two second leg portions 37 in the second direction Dy is the same as the spacing between the two first leg portions 35 in the second direction Dy.

The second base portion 38 links the two second leg portions 37 on the second side Dx2 in the first direction Dx. In other words, the second base portion 38 is disposed on the second side Dx2 of the two second leg portions 37 in the first direction Dx, and is formed to span across the two second leg portions 37 in the second direction Dy. Similarly to the first base portion 36, the second base portion 38 in the present embodiment has a quadrangular prism shape extending in the second direction Dy. In addition, the second base portion 38 is formed integrally with the second leg portions 37. That is, the second leg portions 37 and the second base portion 38 are continuous without forming a gap or the like therebetween. Accordingly, the second outer core portion 32 has a U-shape when viewed from the third direction Dz. In the present embodiment, an example is shown where the cross-sectional area of the second base portion 38 in the cross section perpendicular to the second direction Dy and the cross-sectional area of the second leg portions 37 in the cross section perpendicular to the first direction Dx are the same. In addition, end surfaces 37t of the two second leg portions 37 are planes perpendicular to the first direction Dx and face the first side Dx1 in the first direction Dx.

The intermediate core portion 33 extends in the first direction Dx. The intermediate core portion 33 is continuously and integrally formed in the first direction Dx. In other words, the intermediate core portion 33 has no break such as a joint surface extending in a direction intersecting the first direction Dx in the middle of the first direction Dx.

The intermediate core portion 33 connects the first leg portions 35 of the first outer core portion 31 and the second leg portions 37 of the second outer core portion 32 described above. Specifically, the intermediate core portion 33 connects the first leg portions 35 and the second leg portions 37, each of which is disposed at the same position in the second direction Dy. That is, two intermediate core portions 33 of the present embodiment are arranged side by side in the second direction Dy. Furthermore, the intermediate core portion 33 of the present embodiment is formed to extend the first leg portions 35 and the second leg portions 37 in the first direction Dx. Specifically, the intermediate core portion 33 of the present embodiment has a quadrangular prism shape, and in the cross section perpendicular to the first direction Dx, the cross-sectional area of the intermediate core portion 33, the cross-sectional area of the first leg portions 35, and the cross-sectional area of the second leg portions 37 are the same.

In the present embodiment, a first separator 39 is provided in a first connection portion 41 that connects the intermediate core portion 33 and the first leg portions 35, and a second connection portion 42 that connects the intermediate core portion 33 and the second leg portions 37. This first separator 39 forms a gap for increasing magnetic resistance and reducing magnetic saturation. The first separator 39 of the present embodiment, for example, can be made using materials having excellent heat resistance, such as epoxy, alumina, or the like. In addition, the first separator 39 may be provided as necessary.

<Coil>

The first coil portion 21 and the second coil portion 22 are formed by winding wire materials such as copper wire or the like in a solenoid shape. The first coil portion 21 and second coil portion 22 are wound around the reactor core 23 in a split manner. The first coil portion 21 and the second coil portion 22 are wound in a split manner to span at least across the two intermediate core portions 33 (in the following description, referred to as a first intermediate core portion 33A and a second intermediate core portion 33B) arranged side by side in the second direction Dy.

The first coil portion 21 of the present embodiment has two first split coil portions 21A and 21B connected in series. The first split coil portion 21A is wound around at least the first intermediate core portion 33A, and the first split coil portion 21B is wound around at least the second intermediate core portion 33B. Each of the first split coil portions 21A and 21B of the present embodiment is wound to span across the first leg portion 35 of the first outer core portion 31 and the intermediate core portion 33 in the first direction Dx. Similarly, the second coil portion 22 of the present embodiment has two second split coil portions 22A and 22B connected in series. The second split coil portion 22A is wound around at least the first intermediate core portion 33A, and the second split coil portion 22B is wound around at least the second intermediate core portion 33B. Each of the second split coil portions 22A and 22B of the present embodiment is wound to span across the second leg portions 37 of the second outer core portion 32 and the intermediate core portion 33 in the first direction Dx.

The winding direction of the winding wires of the two first split coil portions 21A and 21B of the first coil portion 21 is oriented in the same direction of the magnetic flux in the closed magnetic circuit of the reactor core 23 generated by these two first split coil portions 21A and 21B. Similarly, the direction, in which the winding wires of the two second split coil portions 22A and 22B of the second coil portion 22 are wound, is oriented in the same direction of the magnetic flux in the closed magnetic circuit of the reactor core 23 generated by these two second split coil portions 22A and 22B. On the other hand, the winding wires of the first split coil portions 21A and 21B and the winding wires of the second split coil portions 22A and 22B are wound in opposite directions so that the magnetic flux generated by the first split coil portions 21A and 21B and the magnetic flux generated by the second split coil portions 22A and 22B are canceled out by each other.

The first coil portion 21 and the second coil portion 22 of the present embodiment have the same number of turns. Then, the two first split coil portions 21A and 21B have the same number of turns as each other, and the two second split coil portions 22A and 22B have the same number of turns as each other. These first coil portion 21 and the second coil portion 22 are disposed apart from each other in the first direction Dx. That is, the first split coil portion 21A and the second split coil portion 22A wound around the first intermediate core portion 33A are apart from each other in the first direction Dx, and the first split coil portion 21B and the second split coil portion 22B wound around the second intermediate core portion 33B are apart from each other in the first direction Dx. In the present embodiment, a distance between the first split coil portion 21A and the second split coil portion 22B wound around the first intermediate core portion 33A is set to be the same as a distance between the first split coil portion 21B and the second split coil portion 22B wound around the second intermediate core portion 33B.

The first connection portion 41, to which the first leg portions 35 and the intermediate core portion 33 are connected, is positioned in an area in which the first coil portion 21 is wound in the first direction Dx. Similarly, the second connection portion 42, to which the second leg portions 37 and the intermediate core portion 33 are connected, is positioned in an area in which the second coil portion 22 is wound in the first direction Dx. In other words, the first connection portion 41 is covered by the first coil portion 21 from the second direction Dy and the third direction Dz, and the second connection portion 42 is covered by the second coil portion 22 from the second direction Dy and the third direction Dz.

In the present embodiment, the first connection portion 41 is positioned in the intermediate portion 21C that is equidistant from both end portions of the first coil portion 21 in the first direction Dx. Similarly, an example is shown where the second connection portion 42 is positioned in the intermediate portion 22C that is equidistant from both end portions of the second coil portion 22 in the first direction Dx. The first connection portion 41 is not limited to the case of being positioned in the intermediate portion 21C. For example, the first connection portion 41 may be positioned on the intermediate portion 21C side of the first coil portion 21 rather than at both end portions of the first coil portion 21 in the first direction Dx. In addition, the first connection portion 41 may be positioned on a side closer to the intermediate portion 21C of the first coil portion 21 than at both end portions of the first coil portion 21 in the first direction Dx. Similarly, the second connection portion 42 is not limited to the case of being positioned in the intermediate portion 22C of the second coil portion 22. For example, the second connection portion 42 may be positioned on the intermediate portion 22C side rather than at both end portions of the second coil portion 22 in the first direction Dx. In addition, the second connection portion 42 may be positioned on a side closer to the intermediate portion 22C of the second coil portion 22 than at both end portions of the second coil portion 22 in the first direction Dx.

<Operating Effects>

As described above, in the magnetically coupled reactor 10 of the present embodiment, the first coil portion 21 and the second coil portion 22 are wound in a split manner to span at least across the two intermediate core portions 33 arranged side by side in the second direction Dy. The first connection portion 41, to which the first leg portions 35 and the intermediate core portion 33 are connected, is positioned in an area in which the first coil portion 21 is wound in the first direction Dx, and the second connection portion 42, to which the second leg portions 37 and the intermediate core portion 33 are connected, is positioned in an area in which the second coil portion 22 is wound in the first direction Dx. In addition, the intermediate core portion 33 extends continuously and integrally in the first direction Dx. In this case, the first connection portion 41 or the second connection portion 42, which is a seam of the reactor core 23, is not disposed between the first coil portion 21 and the second coil portion 22. Therefore, the magnetic flux leaked from the seam of the reactor core 23 is suppressed from interlinking with the end portions of the first coil portion 21 and the second coil portion 22 in the first direction Dx, so that eddy currents generated in the first coil portion 21 and the second coil portion 22 can be reduced.

In the present embodiment, furthermore, at least one of the first connection portion 41 and the second connection portion 42 has a first separator 39 that increases the magnetic resistance. In a case where the first separator 39 is provided in this manner, the leakage magnetic flux from the first connection portion 41 or the second connection portion 42 increases. However, since the first connection portion 41 or the second connection portion 42 is positioned in an area in which the first coil portion 21 or the second coil portion 22 is wound, it is possible to effectively suppress the influence of leakage magnetic flux from the first connection portion 41 or the second connection portion 42, each of which has the first separator 39.

In the present embodiment, furthermore, the direction of the magnetic flux generated by the second coil portion 22 is opposite to the direction of the magnetic flux generated by the first coil portion 21. In this case, as shown in FIG. 3, the magnetic fluxes are canceled out by each other between the first coil portion 21 and the second coil portion 22 in the first direction Dx. Therefore, it is possible to suppress an increase in the size of the reactor core 23. In addition, at this time, for example, in a case where there is a seam in the reactor core 23 between the first coil portion 21 and the second coil portion 22, the magnetic flux leaking from the seam particularly increases. However, since there is no seam in the reactor core 23 between the first coil portion 21 and the second coil portion 22, an increase in leakage magnetic flux can be suppressed.

In the present embodiment, furthermore, the coupling degree between the first coil portion 21 and the second coil portion 22 can be further adjusted by only changing the length of the intermediate core portion 33 extending integrally in the first direction Dx, for example. Therefore, the coupling degree can be easily changed as compared with the case where the reactor core 23 itself is changed in order to change the coupling degree.

Since the boosting circuit 100 of the present embodiment can be reduced in size by including the magnetically coupled reactor 10, a degree of freedom of installation of the boosting circuit 100 can be improved.

Modification Example of Embodiment

Next, a modification example of the embodiment described above will be described with reference to FIG. 5. In the modification example of this embodiment, since only the configurations of the first outer core portion and the second outer core portion are different from those in the above embodiment, the same portions as those in the above embodiment will be described with the same reference numerals, and the description thereof will be omitted.

Figure 5:
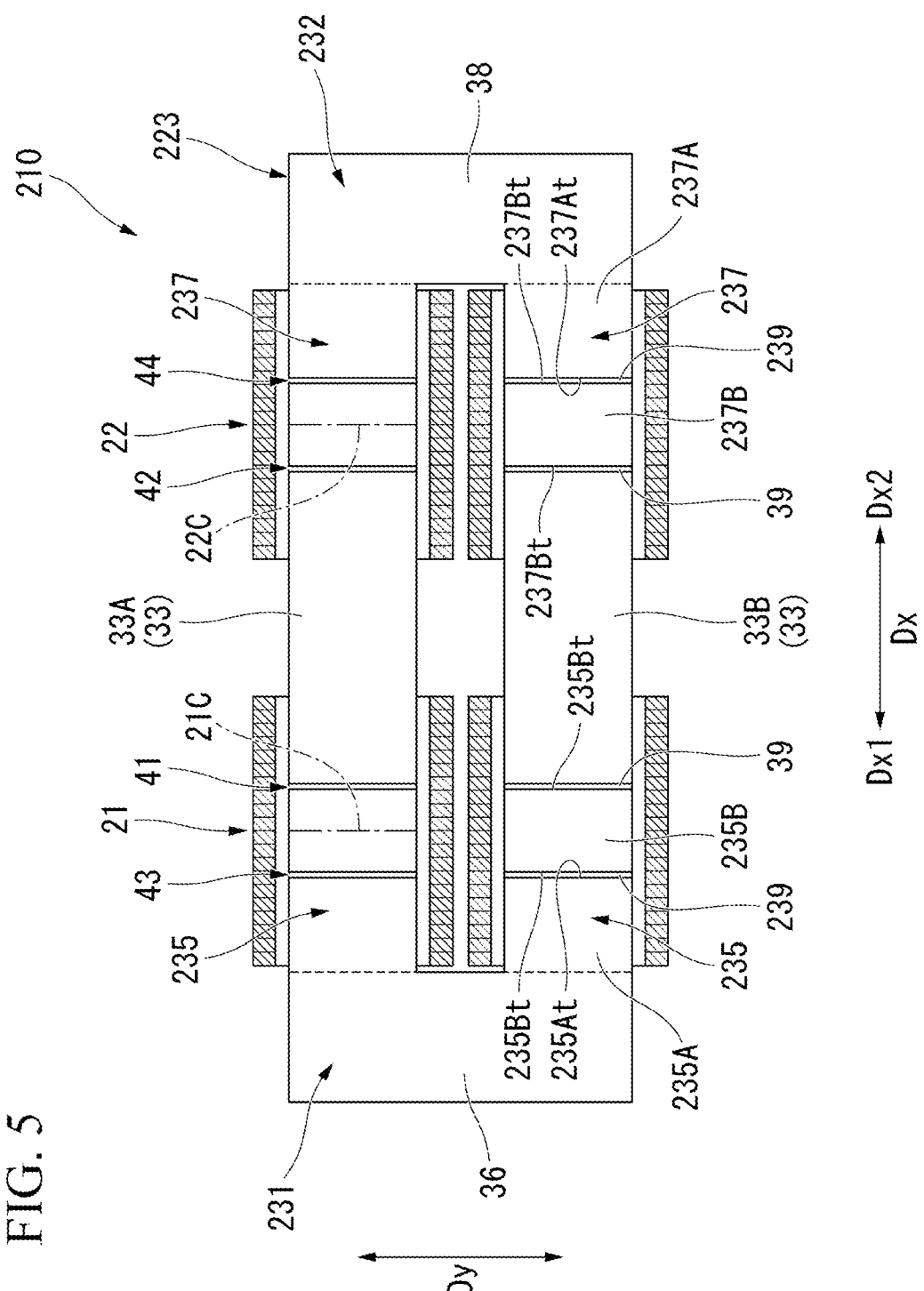
FIG. 5 is a plan view corresponding to FIG. 3 of a reactor core according to a modification example of the embodiment of the present disclosure.

As shown in FIG. 5, the magnetically coupled reactor 210 in the modification example includes a first coil portion 21, a second coil portion 22, and a reactor core 223. The reactor core 223 forms one closed magnetic circuit that magnetically couples the first coil portion 21 and the second coil portion 22, similarly to the reactor core 23 in the above embodiment. The first coil portion 21 and the second coil portion 22 are wound around the reactor core 223 so that the magnetic fluxes of the first coil portion 21 and the second coil portion 22 are canceled out by each other.

The reactor core 223 includes a first outer core portion 231, a second outer core portion 232, and two intermediate core portions 33.

The first outer core portion 231 includes two first leg portions 235 and one first base portion 36. Both of the two first leg portions 235 extend in the first direction Dx. The two first leg portions 235 have the same quadrangular prism shape and have the same length in the first direction Dx. These two first leg portions 235 are disposed apart from each other in the second direction Dy. The spacing between the two first leg portions 235 in the second direction Dy is set according to a wire diameter or the like of the first coil portion 21.

The first leg portion 235 includes a leg portion main body 235A and a split leg portion 235B. The leg portion main body 235A and the split leg portion 235B are disposed side by side in the first direction Dx. The split leg portion 235B is formed to extend the leg portion main body 235A to the second side Dx2 in the first direction Dx and is apart from the leg portion main body 235A in the first direction Dx. In this modification example, an end surface 235At on the second side Dx2 of the leg portion main body 235A in the first direction Dx, as well as both end surfaces 235Bt of the split leg portion 235B in the first direction Dx, all extend in a direction intersecting with the first direction Dx. The end surfaces 235At and 235Bt in this modification example are formed on planes parallel to each other. The shapes of the end surfaces 235At and 235Bt may extend in a direction intersecting the first direction Dx and are not limited to planes parallel to each other. In addition, the length dimensions of the leg portion main body 235A and the split leg portion 235B in the first direction Dx shown in this modification example are the same, but these length dimensions are not limited to the same.

The first base portion 36 has the same configuration as the first base portion 36 in the above embodiment and links the two first leg portions 235 on the first side Dx1 in the first direction Dx. In other words, the first base portion 36 is disposed on the first side Dx1 of the two first leg portions 235 in the first direction Dx, and is formed to span across the two first leg portions 35 in the second direction Dy.

The second outer core portion 232 is formed symmetrically with the first outer core portion 231 in the first direction Dx. The second outer core portion 232 includes two second leg portions 237 and one second base portion 38. Both of the two second leg portions 237 extend in the first direction Dx. The two second leg portions 237 of the present embodiment have the same quadrangular prism shape as the first leg portions 235. The lengths of the two second leg portions 237 in the first direction Dx are the same.

These two second leg portions 237 are disposed apart from each other in the second direction Dy. The spacing between the two second leg portions 237 in the second direction Dy is the same as the spacing between the two first leg portions 235 in the second direction Dy.

The second leg portion 237 includes a leg portion main body 237A and a split leg portion 237B. The leg portion main body 237A and the split leg portion 237B are disposed side by side in the first direction Dx. The split leg portion 237B is formed to extend the leg portion main body 237A to the first side Dx1 in the first direction Dx and is apart from the leg portion main body 237A in the first direction Dx. Similarly to the first leg portions 235, in this modification example, an end surface 237At on the first side Dx1 of the leg portion main body 237A in the first direction Dx, as well as both end surfaces 237Bt of the split leg portion 237B in the first direction Dx, all extend in a direction intersecting with the first direction Dx. The end surfaces 237At and 237Bt in the modification example are formed on planes parallel to each other. The shapes of the end surfaces 237At and 237Bt may extend in a direction intersecting the first direction Dx and are not limited to planes parallel to each other. In addition, the length dimensions of the leg portion main body 237A and the split leg portion 237B in the first direction Dx shown in this modification example are the same, but these length dimensions are not limited to the same.

The second base portion 38 has the same configuration as the second base portion 38 in the above embodiment and links the two second leg portions 237 on the first side Dx1 in the first direction Dx. In other words, the second base portion 38 is disposed on the second side Dx2 of the two second leg portions 237 in the first direction Dx, and is formed to span across the two second leg portions 237 in the second direction Dy.

In between the leg portion main body 235A and the split leg portion 235B provided in the first leg portions 235 (hereinafter, referred to as the third connection portion 43), and between the leg portion main body 237A and the split leg portion 237B provided in the second leg portions 237 (hereinafter, referred to as the fourth connection portion 44), a second separator 239 is disposed in each case. The second separator 239 has the same configuration as the first separator 39 described above, and for example, can be made using materials having excellent heat resistance, such as epoxy, alumina, or the like. The second separator 239 increases the magnetic resistance in the first direction Dx within the first leg portions 235 and the second leg portions 237.

The second separator 239 provided in the first leg portions 235 (in other words, the third connection portion 43) is disposed in an area in which the first coil portion 21 is wound in the first direction Dx. Similarly, the second separator 239 provided in the second leg portions 237 (in other words, the fourth connection portion 44) is disposed in an area in which the second coil portion 22 is wound in the first direction Dx.

Here, similarly to the above embodiment, the first connection portion 41, to which the first leg portions 235 and the intermediate core portion 33 are connected, is positioned in an area in which the first coil portion 21 is wound in the first direction Dx. Similarly, the second connection portion 42, to which the second leg portions 237 and the intermediate core portion 33 are connected, is positioned in an area in which the second coil portion 22 is wound in the first direction Dx. That is, the first connection portion 41, the second connection portion 42, the third connection portion 43, and the fourth connection portion 44 are all positioned in an area in which the first coil portion 21 or the second coil portion 22 is wound in the first direction Dx, and the first connection portion 41, the second connection portion 42, the third connection portion 43, and the fourth connection portion 44 are covered by either the first coil portion 21 or the second coil portion 22.

In this modification example, the first connection portion 41 and the third connection portion 43 are formed at positions symmetric with each other in the first direction Dx with respect to the intermediate portion 21C of the first coil portion 21, and the second connection portion 42 and the fourth connection portion 44 are formed at positions symmetric with each other in the first direction Dx with respect to the intermediate portion 22C of the second coil portion 22. More specifically, in this modification example, an example is shown where the first connection portion 41 and the third connection portion 43 are each positioned at the boundary position when the first coil portion 21 is divided into three equal parts in the first direction Dx, and the second connection portion 42 and the fourth connection portion 44 are each positioned at the boundary position when the second coil portion 22 is divided into three equal parts in the first direction Dx. However, the positions of the first connection portion 41 to the fourth connection portion 44 are not limited to the above positions.

<Operating Effects>

As described above, in the magnetically coupled reactor 10 in the modification example of the present embodiment, the second separator 239, which increases magnetic resistance, is provided in an area of the first leg portions 235 of the first outer core portion 231 in which the first coil portion

21 is wound and in an area of the second leg portions 237 of the second outer core portion 232 in which the second coil portion 22 is wound. In this case, since the number of air gaps formed in the reactor core 223 can be increased, it is possible to suppress the occurrence of magnetic saturation. Furthermore, since the first separator 39 and the second separator 239 can be covered by either the first coil portion 21 or the second coil portion 22, the magnetic flux leaking from the first separator 39 and the second separator 239 is suppressed from interlinking with the first coil portion 21 and the second coil portion 22, so that eddy currents generated in the first coil portion 21 and the second coil portion 22 can be reduced.

In the above modification example, similarly to the above embodiment, the coupling degree between the first coil portion 21 and the second coil portion 22 can be adjusted by only changing the length of the intermediate core portion 33 extending integrally in the first direction Dx. Therefore, the coupling degree can be easily changed as compared with the case where the reactor core 223 itself is changed in order to change the coupling degree.

Other Embodiments

Hitherto, the embodiment according to the present disclosure has been described. However, the present disclosure is not limited thereto and can be appropriately modified within the scope not departing from the technical idea of the present disclosure.

In the above embodiment, an example in which the present disclosure is applied to the boosting circuit 100 of the hybrid hydraulic excavator has been described. However, the present disclosure may be applied to other boosting circuits.

In the above embodiment and modification example, the reactor cores 23 and 223 are shown as examples when formed by stacking electromagnetic steel sheets. However, the reactor cores 23 and 223 may be formed by pressurizing and molding raw material powder containing soft magnetic powder. Examples of the soft magnetic powder contained in the raw material powder can include powders of various alloys, pure iron, or the like, which are soft magnetic materials.

In the above embodiment and modification example, a case where the first outer core portions 31 and 231 and the second outer core portions 32 and 232 are formed by a combination of quadrangular prism shapes has been described. However, the first outer core portions 31 and 231 and the second outer core portions 32 and 232 may have a U-shape when viewed from the third direction Dz, but not limited to the above-described shape. In addition, an example of the intermediate core portion 33 extending linearly in the first direction Dx is provided. However, the present disclosure is not limited to the linear shape, for example, the intermediate core portion 33 may have a curved shape or a shape obtained by appropriately combining a curved line, a straight line, or the like.

In the modification example of the above embodiment, a case has been described where the second separator 239, which increases the magnetic resistance, is provided in both an area of the first leg portions 235 of the first outer core portion 231 in which the first coil portion 21 is wound, and an area of the second leg portions 237 of the second outer core portion 232 in which the second coil portion 22 is wound. However, the second separator 239 may be provided in at least one of an area of the first leg portions 235 of the first outer core portion 231 in which the first coil portion 21 is wound, and an area of the second leg portions 237 of the second outer core portion 232 in which the second coil portion 22 is wound.

Furthermore, in the above modification example, a case has been described where two separators, the first separator 39 and the second separator 239, are provided in an area in which either the first split coil portions 21A and 21B, or the second split coil portions 22A and 22B is wound. However, three or more separators (in other words, air gaps) may be provided spaced apart in the first direction Dx.

In the above embodiment and modification example, other core portions formed to extend the first leg portions 35 and 235 and the second leg portions 37 and 237 in the first direction Dx may be provided between the first outer core portions 31 and 231 and the intermediate core portion 33 and between the second outer core portions 32 and 232 and the intermediate core portion 33.

In the above embodiment and modification example, an insulating material made of synthetic resin or the like may be appropriately disposed between the first coil portion 21 and the reactor cores 23 and 223 and between the second coil portion 22 and the reactor cores 23 and 223.

INDUSTRIAL APPLICABILITY

According to the above aspect, it is possible to reduce the interlinking of leakage magnetic flux with winding wires while suppressing an increase in size.

REFERENCE SIGNS LIST

10: magnetically coupled reactor
11A, 11B: smoothing capacitor
12: switching element
13: freewheeling diode
14: boosting chopper circuit
15: high-side arm
16: low-side arm
21: first coil portion
21A, 21B: first split coil portion
21C: intermediate portion
22: second coil portion
22A, 22B: second split coil portion
22C: intermediate portion
23, 223: reactor core
31, 231: first outer core portion
32, 232: second outer core portion
33: intermediate core portion
33A: first intermediate core portion
33B: second intermediate core portion
35, 235: first leg portion
35t: end surface
36: first base portion
37, 237: second leg portion
37t: end surface
38: second base portion
39: first separator
41: first connection portion
42: second connection portion
43: third connection portion
44: fourth connection portion
235A: leg portion main body
235At: end surface
235B: split leg portion
235Bt: end surface
237A: leg portion main body
237At: end surface

237B: split leg portion
237Bt: end surface
239: second separator

The invention claimed is:

1. A magnetically coupled reactor comprising:
a reactor core forming a closed magnetic circuit;
a first coil portion wound around the reactor core in a split manner; and
a second coil portion wound in a split manner at a position apart from the first coil portion in a first direction in the reactor core,
wherein the reactor core includes
a first outer core portion including two first leg portions extending in the first direction and a first base portion linking the two first leg portions on a first side in the first direction,
a second outer core portion including two second leg portions extending in the first direction and a second base portion linking the two second leg portions on a second side in the first direction, and
first and second intermediate core portions arranged side by side in a second direction intersecting the first direction and integrally extending continuously in the first direction to connect the first leg portions and the second leg portions,
the first coil portion and the second coil portion are wound in a split manner to span at least across the two intermediate core portions arranged side by side in the second direction,
a first connection portion defined between the first leg portions and the first intermediate core portion and positioned such that the first coil portion is wound in the first direction around at least the first connection portion, and
a second connection portion defined between the second leg portions and the second intermediate core portion and positioned such that the second coil portion is wound in the first direction around at least the second connection portion.

2. The magnetically coupled reactor according to claim 1, further comprising
a first separator configured to increase magnetic resistance and provided in at least one of the first connection portion and the second connection portion.

3. The magnetically coupled reactor according to claim 1, wherein, the first coil portion and the second coil portion are wound in directions such that a direction of magnetic flux generated in the closed magnetic circuit by the second coil portion is opposite to a direction of magnetic flux generated in the closed magnetic circuit by the first coil portion.

4. The magnetically coupled reactor according to claim 1, further comprising
a second separator configured to increase magnetic resistance and provided in at least one of an area of the first leg portions of the first outer core portion in which the first coil portion is wound, and an area of the second leg portions of the second outer core portion in which the second coil portion is wound.

5. A boosting circuit comprising:
the magnetically coupled reactor according to claim 1;
two-phase chopper circuits connected to the first coil portion and the second coil portion of the magnetically coupled reactor; and
two smoothing capacitors connected between input terminals and output terminals.

6. A magnetically coupled reactor comprising:

a reactor core forming a closed magnetic circuit;

a first coil portion wound around the reactor core in a split manner; and a second coil portion wound in a split manner at a position apart from the first coil portion in a first direction in the reactor core, wherein the reactor core includes a first outer core portion including two first leg portions, each of the two first leg portions including a first leg portion main body and a first split leg portion, extending in the first direction and a first base portion linking the two first leg portions on a first side in the first direction, a second outer core portion including two second leg portions, each of the two second leg portions including a second leg portion main body and a second split leg portion, extending in the first direction and a second base portion linking the two second leg portions on a second side in the first direction, and first and second intermediate core portions arranged side by side in a second direction intersecting the first direction and integrally extending continuously in the first direction to connect the first leg portions and the second leg portions, the first coil portion and the second coil portion are wound in a split manner to span at least across the two intermediate core portions arranged side by side in the second direction, a first connection portion defined between the first split leg portion and the first intermediate core portion and positioned such that the first coil portion is wound in the first direction around at least the first connection portion, and a third connection portion defined between the first leg portion main body and the first split leg portion and positioned such that the first coil portion is wound in the first direction around at least the third connection portion;

a first separator configured to increase magnetic resistance and provided in the first connection portion, and a second separator configured to increase magnetic resistance and provided in the third connection portion.

7. The magnetically coupled reactor according to claim 6, further comprising:

a second connection portion defined between the second split leg portion and the second intermediate core portion and positioned such that the second coil portion is wound in the first direction around at least the second connection portion, and a fourth connection portion defined between the second leg portion main body and the second split leg portion and positioned such that the second coil portion is wound in the first direction around at least the second connection portion;

a third separator configured to increase magnetic resistance and provided in the second connection portion, and a fourth separator configured to increase magnetic resistance and provided in the fourth connection portion.

* * * * *